(No Model.) 2 Sheets—Sheet 1.

R. H. AVERY, Dec'd.
F. R. AVERY, Administrator.
TONGUELESS CULTIVATOR.

No. 537,400. Patented Apr. 9, 1895.

Witnesses:
J. B. McGirr.
W. H. Edwards

Inventor:
Frederic R. Avery, Administrator
of estate of R. H. Avery
By H. H. Bliss.
Atty.

(No Model.) 2 Sheets—Sheet 2.
R. H. AVERY, Dec'd.
F. R. AVERY, Administrator.
TONGUELESS CULTIVATOR.
No. 537,400. Patented Apr. 9, 1895.
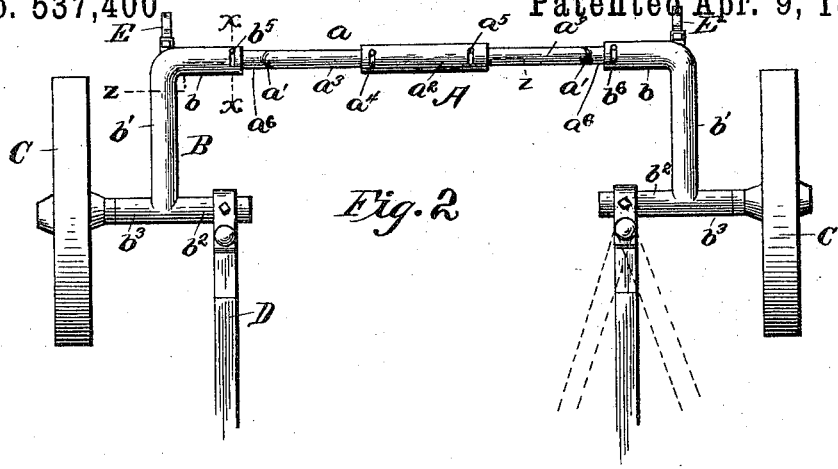
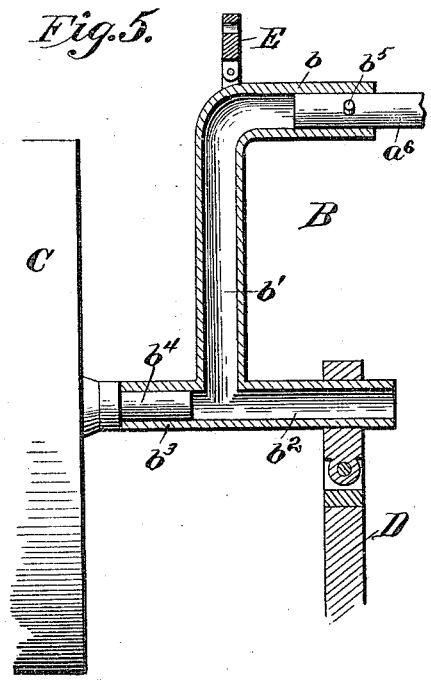
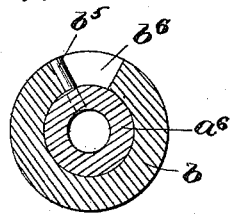
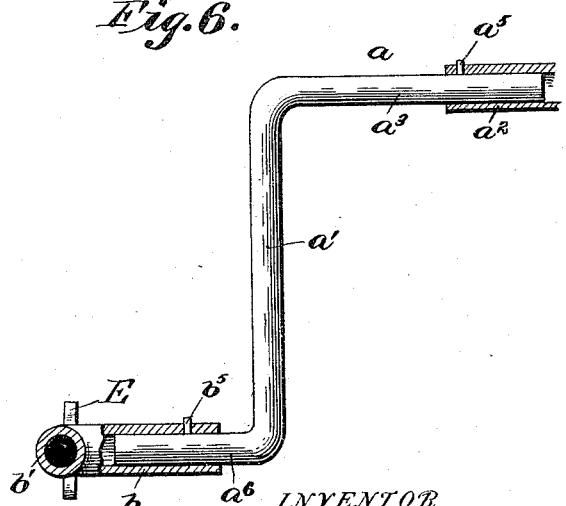
WITNESSES
Howard D. Orr.
W. Edwards
INVENTOR
Frederic R. Avery, Administrator
estate of R. H. Avery
By J. H. Bliss
Attorney

UNITED STATES PATENT OFFICE.

FREDERIC R. AVERY, OF PEORIA, ILLINOIS, ADMINISTRATOR OF ROBERT H. AVERY, DECEASED.

TONGUELESS CULTIVATOR.

SPECIFICATION forming part of Letters Patent No. 537,400, dated April 9, 1895.

Original application filed April 23, 1890, Serial No. 349,136. Divided and this application filed December 14, 1894. Serial No. 531,777. (No model.)

*To all whom it may concern:*

Be it known that ROBERT H. AVERY, deceased, late a citizen of the United States, residing at Peoria, county of Peoria, State of Illinois, and of whose estate FREDERIC R. AVERY, of Peoria aforesaid, is now the administrator, has heretofore invented new and useful Improvements in Tongueless Cultivators, of which the following is a specification, reference being had to the accompanying drawings, wherein—

Figure 1:
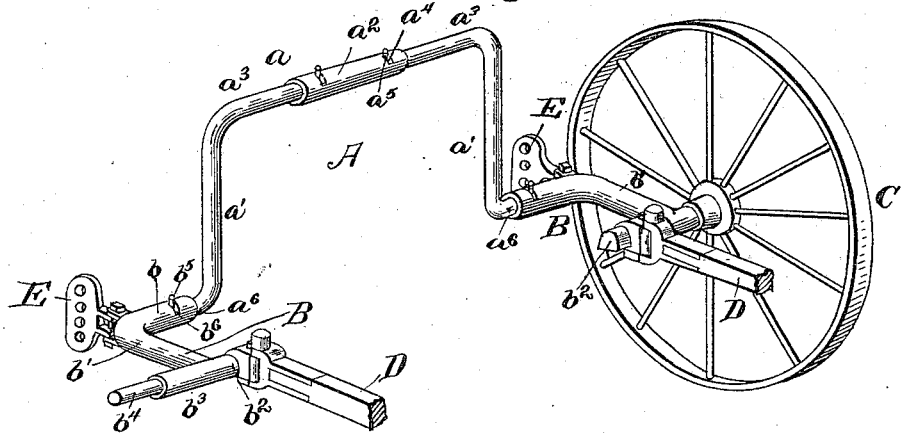
Figure 3:
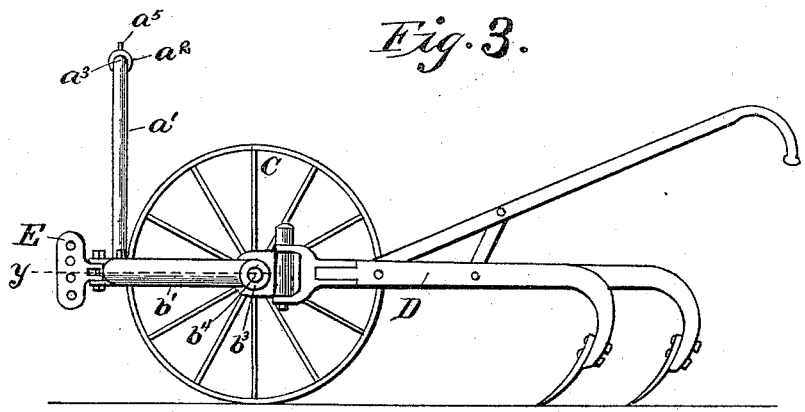

Figure 1 is a perspective of a sufficient portion of a tongueless cultivator to illustrate the manner of embodying the improvements. Fig. 2 is a plan view of a portion of the machine. Fig. 3 is a side view with the adjacent wheel removed. Fig. 4 is a section on the line $x\ x$ of Fig. 2. Fig. 5 is a section on the line $y\ y$ of Fig. 3. Fig. 6 is a section on the line $z\ z$ of Fig. 2.

In the drawings the machine is shown as having two ground wheels and two wheel frames together with a connecting device. The connecting part is of the nature of an arch adapted to straddle a row of plants. It is indicated as a whole by A and has the upper horizontal part $a$, and the vertical parts $a'$. Some of the ends of the invention can be attained if these vertical parts $a'$ and the horizontal part $a$ are integral or rigidly secured together; but in order to insure sufficient flexibility for the purposes to be described it is preferred to so construct them that the wheel frame on one side can have an axial motion with respect to the wheel frame on the other side, and therefore interpose a hinge-like union, it preferably consisting of a sleeve or tube $a^2$ pivotally connected to one or both of the side parts $a^3$ of the arch. It may be secured rigidly to one and have a slot $a^4$ receiving a pin projecting from the part $a^3$, or it may have such a slot and pin connection with each of the side parts.

At the bottoms of the vertical bars $a'$ there are outwardly turned bars $a^6$. To these are connected the wheel carrying bars or frames B. These extend back from the vertical plane of the arch, as at $b'$, and are then secured to or formed with an outwardly turned arm $b^3$ and an inwardly turned arm $b^2$. The bar $b^3$ is secured to, or shaped to provide the spindle $b^4$ upon which is secured the wheel C. The backward extending bars $b'$ are of such length that the weight of the arch and the parts in or near its vertical planes shall have a relatively large leverage downward around the axis of the wheels, for a purpose to be explained. The inward projecting arm $b^2$, on each side, is utilized for the connection to the frame of one of the two plow beams or gang bars. The latter are indicated by D. Each is secured to its arm or spindle $b^2$ in such way that it can freely vibrate or oscillate laterally to permit the shovels to move out or in as they move along the ground, but the coupling should be such as to prevent the beam from moving up independently of the arm $b^2$ or of the frame—that is to say, the connection is such that when the beam is lifted up it instantly tends to cause or permit the downward moving of the part of the frame which is in front of the wheel axis. Hence it will be seen that when the beams are lifted by the operator the weight of the rear parts and of the shovels attached thereto will be counterbalanced, so that the manipulation of them in guiding them or lifting them can be accomplished with ease; but the purpose of the present invention is to go beyond a mere counterbalancing of both the beams and shovel gangs when they are simultaneously lifted; and is to provide for the counterbalancing of each beam and gang independently of the other, so that the same assistance shall be given to the operator when he is lifting one gang alone, and in such way as to not interfere with the operation of the shovels of the other gang. This end is attained to some extent by reason of the presence of the hinge at $a^5\ a^4$; but to provide the requisite flexibility of connection for either side wheel frame relatively to the other, and also relatively (to some extent) to the arch an axial or hinge-like connection is introduced between the bars $b'$ and the arch, preferably by forming the part $b$ tubular, and fitting into it the bar $a^6$ so that the arch and the wheel frame on either side shall have more or less vertical motion, one independently of the other. To hold the parts in proper position without interfering with the desired degree of oscillation they are joined by means of a pin $b^5$ in a slot $b^6$.

It will now be seen that if either beam and gang is lifted at the rear the parts $b^2$, $b^3$ will tend to rock on the axis of the wheels, and will force the bar $b'$ downward, the latter carrying with it the bar $b$ and one side of the arch. The weight of the arch and of the wheel frame B will act to counterbalance the rear part of the beam and gang. The flexible connections at $a^6$, $b$ and at $a^2$, $a^3$ prevent interference with one beam and its set of shovels when the other is being lifted. In other words there is an independent counterbalance of each shovel gang, as well as a counterbalancing of both shovel gangs when they are lifted together.

It will be seen that the necessity of caster wheels, or wheels so mounted that they can vibrate horizontally is obviated and yet there is independence of draft on the two sides of the machine. The horses are hitched to the clevis plates E which are secured to a suitable part of the wheel frames, preferably to the front bars $b$; and each horse can have more or less variation in position forward and backward, relatively to the position of the other, without interfering with the proper action of the machine, as the plow gangs can be advanced or retarded independently of each other because of the hinge-like joint at $a^2$ $a^3$. Broadly considered, this feature is not novel; but it is believed that no tongueless cultivator has been heretofore constructed in the way shown and described, that is, with this independence of draft, together with the backwardly projecting wheel frames to which the wheels are directly secured, in such way that those parts of the frame which lie in front of the wheel axis can be utilized to counterbalance both gangs simultaneously, or either independently of the other.

No claim is herein made to any of the matters presented in the claims in the earlier application of R. H. Avery, Serial No. 349,136, filed April 23, 1890, of which application the present one is a division.

What is claimed is—

1. In a tongueless cultivator, the combination of the row straddling arch, the wheel frames extending backwardly therefrom, the wheels mounted on the said frames, and the plow beams connected to the said backwardly extending wheel frames, at a line behind the vertical plane of the arch, and on or near the axis of the wheels, whereby the wheel frames and the arch are projected to the front of the gangs, said wheel frames and gangs being vibratable together independently of the arch, substantially as set forth.

2. The combination of the arch, the backwardly extending wheel frames, vibratable vertically independently of each other the wheels mounted on axes fixed relatively to the said wheel frames, and the plow beams secured to said wheel frames at the axis of the wheels and arranged to vibrate laterally, substantially as set forth.

3. The combination, in a tongueless cultivator, of the arch, the backwardly extending wheel frames, the wheels mounted on axes behind the vertical plane of and fixed relatively to the arch, and the laterally vibratable gangs secured to the wheel frames, at a line in rear of the vertical plane of the arch to have the said wheel frames and arch projected in front of the gangs substantially as set forth.

4. In a tongueless cultivator, the combination of the arch, the backward extending wheel frames, the wheels mounted on axes fixed in relation to the arch, and the two independently counterbalanced shovel beams, substantially as set forth.

5. In a tongueless cultivator, the combination of the arch, the draft devices adapted to move forward and back relatively to the normal plane of the arch independently of each other, the wheels, and the two independently counterbalanced plow beams, substantially as set forth.

6. In a tongueless cultivator, the combination of the arch, the rearwardly extending wheel frames, the wheels mounted on the said frames, and the laterally vibratable plow beams secured to the wheel frames behind the arch and vibratable vertically with the said wheel frames, and each held to its wheel frame against vertical vibration in relation thereto substantially as set forth.

7. The combination of the arch, the wheels, the means for connecting the wheels to the arch, and the independently advancing plow beams secured thereto rigidly, vertically, but vibratable vertically independently of each other, substantially as set forth.

8. The combination of the wheels, the forwardly extending wheel frames, and an arch or cross connecting device united to the wheel frames, and formed in two parts vibratable vertically independently of each other and of the wheel frames, substantially as set forth.

9. The combination of the wheels, the forwardly projecting wheel frames, and the arch formed in two parts vibratable independently of each other, and of which parts one is connected by a horizontal hinge to a wheel frame, substantially as set forth.

10. In a tongueless cultivator, the combination of the wheels, the forwardly projecting wheel frames vibratable vertically on the axis of the wheels, the plow gangs attached to the wheel frames in rear of the arch, and the arch having a horizontal hinge like connection with one or both of the wheel frames, substantially as set forth.

11. In a tongueless cultivator, the combination of the arch, and the backward extending wheel frames B having the hinge part $b$, the bar $b'$, the wheel support $b^4$ and the beam support $b^2$, substantially as set forth.

12. In a tongueless cultivator, the combination of the arch bars $a^3$, the sleeve $a^2$ pivotally connected to said bars, and the backward extending wheel frames B each having the hinge part $b$, the bar $b'$, the wheel support $b^4$ and the beam support $b^2$, substantially as set forth.

In testimony whereof I affix my signature in the presence of two witnesses.

FREDERIC R. AVERY,
*Administrator.*

Witnesses:
G. F. CARSON,
HARRY N. BLACKMON.